Nov. 14, 1933.  J. I. BELLAMY  1,934,692
BATTERY CHARGING CONTROL SYSTEM
Filed Feb. 13, 1928
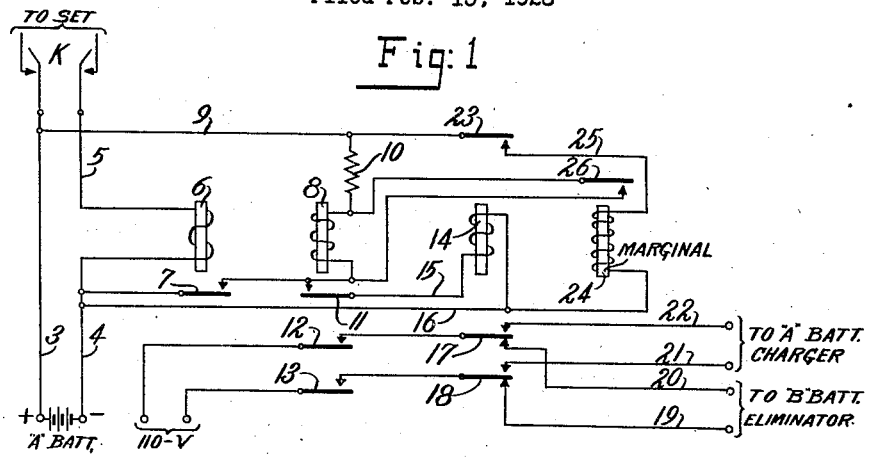
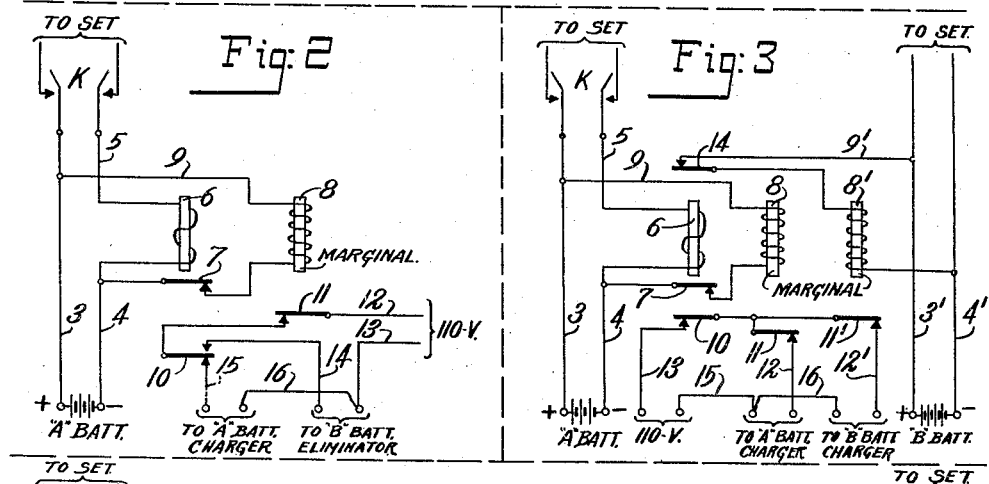
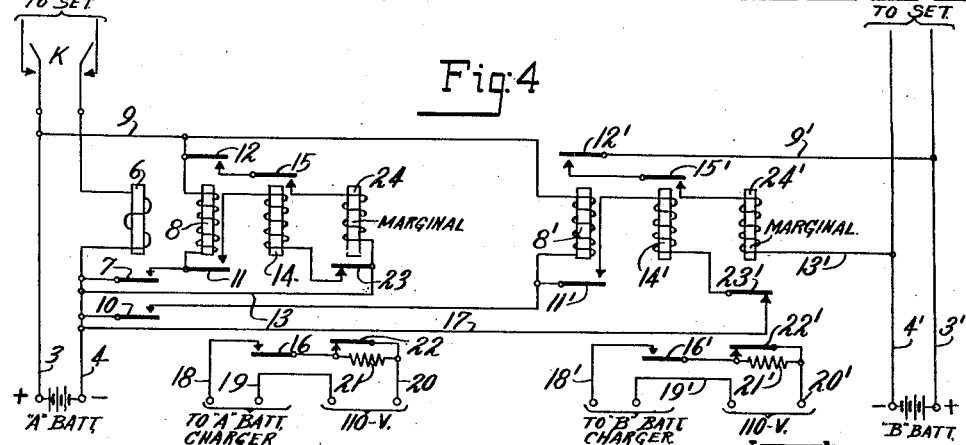
Inventor
John I. Bellamy Patented Nov. 14, 1933

1,934,692

UNITED STATES PATENT OFFICE.

1,934,692

BATTERY CHARGING CONTROL SYSTEM

John I. Bellamy, Brookfield, Ill., assignor, by mesne assignments, to Associated Electric Laboratories, Inc., Chicago, Ill., a corporation of Delaware Application February 13, 1928. Serial No. 253,809

5 Claims. (Cl. 171—314)

The present invention relates in general to battery charging and regulating systems, and more particularly to such a system for controlling the charging of storage batteries that supply current to radio receiving sets, although the invention is not necessarily confined specifically thereto.

When a radio set is supplied with current from a storage battery, it is desirable to have the starting and stopping of the charge of the battery automatically controlled so as to relieve the user of the set of this added task. One system of battery regulation that has been used to some extent in connection with storage batteries employs a marginal relay which pulls up to stop the charge of the battery and which again falls back when the voltage again becomes low to restart the charge. This arrangement is not entirely satisfactory for home use for cutting off the charge on account of the close adjustment required in order to cause a relay to fall back within the close limits required so as to start the charge before the battery has discharged to a dangerous point. It was therefore conceived that it would be a logical step to always start the charge when the radio set is turned off rather than depending upon the dropping back of a marginally adjusted relay to start the charge.

It is accordingly an object of the invention to provide a suitable regulator controlled by the intermittent operation of the set for causing the battery to be charged as often as it is used so that it is always kept near the point of full charge.

It is a further object to provide a regulating device which will prevent charging while the set is turned on and will start the charge only after the set has been turned off so as to prevent noises in the radio set which may occur when the charging rate is high or when certain types of chargers are used.

It is a further object of the invention to provide an arrangement which in addition to regulating the charging of an "A" battery, supplies current to the so called "B" battery eliminator (in case one is used) only while the set is in operation, the current being disconnected from the eliminator automatically when the "A" battery circuit is opened.

A further object is to provide an arrangement which will control the charging not only of the so-called "A" batteries that supply filament current to the vacuum tubes of radio sets but also of the so-called "B" batteries which supply plate current to the set.

A feature of the arrangement is that the "B" battery-regulating portion of the regulator, as well as the "A" battery portion thereof, is controlled from the flow of current in the "A" battery leads, the only connection to the "B" battery leads being a high-resistance bridged marginal relay for controlling the stopping of the charging operation of the "B" battery when the voltage thereof has reached the predetermined point.

A further feature of the arrangement is that the charging operations of the two batteries are stopped separately as they reach their proper respective voltages.

A further feature is that in case the radio set is turned on again for use before one or both batteries have been fully charged, the charging operation is automatically halted until the set is again turned off.

A more complete understanding of my invention may be obtained from the detailed description and claims which are to follow, reference being had to the accompanying drawing in which Fig. 1 diagrammatically represents a regulator for radio systems employing a "B" battery eliminator and a wet "A" battery.

Fig. 2 is a modification of Fig. 1 for similar systems.

Fig. 3 is a modification of Fig. 2, for systems employing wet "A" and "B" batteries.

Fig. 4 is a modification of Fig. 1, for systems employing wet "A" and "B" batteries.

Referring in detail to Fig. 1, the conductors 3, 4, and 5 represent the conductors which connect the terminals of the "A" battery to the terminals of the switch K in the radio set. The winding of relay 6, which is a low resistance winding, has been placed in series with conductors 4 and 5 so that when the radio set is turned on, relay 6 will operate in a circuit which may be traced from the positive terminal of the "A" battery, conductor 3, through the contacts of key K in the radio set, conductor 5, winding of relay 6, conductor 4 to the negative terminal of the "A" battery. Relay 6 in operating moves its armature to close spring 7 and its make contact to complete the circuit for relay 8, which circuit is traceable from the positive terminal of the "A" battery, conductor 3, conductor 9, resistance 10, winding of relay 8, spring 7 and its make contact, conductor 4 to the negative terminal of the "A" battery. Relay 8 operates in this circuit and locks itself energized through relay 14. Relay 14 does not yet operate because it is short circuited by spring 7 and its make contact. Relay 8 in operating operates its springs 12 and 13 to connect commercial current to the "B" eliminator via springs 12 and 13 and their make contacts, springs 17 and 18 and their back contacts, and conductors 19 and 20.

Relays 6 and 8 will remain energized as long as the radio set remains in use. When the set has been turned off, the circuit for relay 6 will be opened at key K and relay 6 will deenergize. In doing so it releases the spring 7 from its make contact thus opening the original energizing circuit of relay 8 and removing the short circuit of relay 14. Relay 14 will now operate in series with relay 8, the circuit of these relays being traceable from the positive terminal of the "A" battery, conductor 3, conductor 9, resistance 10, winding of relay 8, spring 11 and its make contact, conductor 15, winding of relay 14, conductor 16, conductor 4 to the negative terminal of the "A" battery. Relay 14 in operating moves its springs 17 and 18 into engagement with their make contacts, thereby removing the commercial current from conductors 19 and 20 which lead to the "B" eliminator and connecting it to conductors 21 and 22 which lead to the "A" battery charger. Relay 14 by moving spring 23 into engagement with its make contact completes the circuit for relay 24 which may be traced from the positive terminal of the "A" battery, conductor 3, conductor 9, spring 23 and its make contact, conductor 25, winding of relay 24, conductor 16, conductor 4 to the negative terminal of the "A" battery. Relay 24 is margined to operate only when the "A" battery is fully charged.

Assuming that the radio set has been running for a comparatively long period and has caused a considerable drain on the "A" battery, it follows that when relay 14 has completed the circuit of relay 24 at spring 23 and its make contact, relay 24 will not operate because of the reduced voltage of the "A" battery. Therefore, since relay 14 by the movement of springs 17 and 18 into engagement with their make contacts has connected commercial current to the "A" battery charger, the charger will operate to charge the "A" battery.

When the voltage of the "A" battery has been increased to "full charge", relay 24 will operate in the circuit previously traced to move spring 26 into engagement with its make contact, short circuiting relay 8, causing relay 8 to deenergize. Relay 8, in deenergizing allows springs 11, 12, and 13 to disengage their make contacts, thus breaking the circuit of relay 14 and disconnecting commercial current from the "A" battery charger, stopping the charging process. When its circuit is broken, relay 14 will deenergize and 24 deenergizes to separate spring 26 and its springs 17 and 18 and their back contacts, relay 14 will prepare the circuit for the "B" eliminator so that when the set is again turned on, the "B" eliminator will function. Relay 24 will also deenergize when its circuit is broken and release its spring 26 to remove the short circuit about relay 8, placing the apparatus in its normal position.

Should the radio set be turned on and the relay 6 operated between the time relay 24 operates to short circuit relay 8 and the time relay 24 deenergizes to separate spring 26 and its make contact, the engagement of spring 7 with its make contact would short circuit the "A" battery by way of spring 26 and its make contact. Although this state of things may occur only once in a long time, the resistance 10 has been placed in the circuit to prevent damage to the equipment.

It will be assumed now that when the radio set was turned off there had been a very little drain on the "A" battery so that this battery still remains at full charge. In this case, relay 24 operates in a short time when its circuit is completed by relay 14 as has been previously described. Thus the charge is stopped and the regulating apparatus is returned to its normal position.

It will be seen that the regulator I have provided automatically controls the charging process and when the equipment is not functioning there is no drain on the battery.

Referring now to Fig. 2, the operation of this system, which is a modification of the one just described, will be explained in detail.

Conductors 3, 4, and 5 again represent those which feed the radio set current from the "A" battery. Relay 6 is again placed in series with conductors 4 and 5 so that when the radio set has been turned on the relay 6 will energize in a circuit from the positive terminal of the "A" battery, conductor 3, through the contacts of key K in the radio set, conductor 5, winding of relay 6, conductor 4 to the negative terminal of the "A" battery. Relay 6, in energizing, moves its spring 7 out of engagement with its back contact and moves its spring 10 into engagement with its alternate contact. This movement of spring 10 connects the commercial current to the "B" battery eliminator via conductor 14. Relay 6 will remain energized as long as the radio set is in use.

When the radio set is turned off, relay 6 will deenergize to move spring 10 into engagement with its back contact, thus transferring the commercial current to the "A" battery charger via conductor 15. The complete circuit of the commercial current may be traced from the tap, conductor 12, spring 11 and its back contact, spring 10 and its back contact, conductor 15, "A" battery charger, conductor 16, conductor 13 to the tap. The charger will operate to charge the "A" battery.

Relay 6 in deenergizing also completes the circuit for relay 8 at spring 7 and its back contact. This circuit is traceable from the positive pole of the "A" battery, conductor 3, conductor 9, winding of relay 8, spring 7 and its back contact, conductor 4 to the negative pole of the "A" battery. Relay 8 is so margined that it will only operate when the voltage of the "A" battery is at its maximum.

It will be assumed that the radio set was in use for a considerably long period of time and that the drain on the "A" battery was such that there was an appreciable drop in its voltage. Therefore relay 8 will not energize when the set is turned off.

After the charger has brought the voltage of the "A" battery up to its maximum, the relay 8 will energize in the circuit previously traced and by moving its spring 11 out of engagement with its back contact will stop the charger by removing the supply of commercial current. It can be seen that relay 8 will remain energized as long as the voltage of the "A" battery remains at its maximum and the radio set is not in use. If the set should be turned on again, relay 6 will energize to connect commercial current to the "B" eliminator as before described, and deenergize relay 8 to complete the commercial current circuit of the eliminator.

From the above it will be seen that relay 8 will remain energized at all times when the voltage of the "A" battery is "up" and the set is idle, and that there will be a constant drain on the battery. However, this drain is so small that it is practically negligible for it would take a period of months to run the battery down to such a point that the voltage would be insufficient to hold relay 8 energized. If this should occur, relay 8 would deenergize and start the charging process. The charging would continue until the voltage was again restored, when relay 8 would again energize to cut off the charge.

Referring now to Fig. 3, the operation of this system will be described in detail, it being remembered that Fig. 3 is used in systems employing wet "A" and "B" batteries.

As in Figs. 1 and 2, numerals 3, 4, and 5 represent the conductors over which current is fed from the "A" battery to the radio set, 6 is the series relay controlled by the operation of the radio set, and 8 is the cut-off relay, normally bridged across the "A" battery terminals, which stops the charging when the "A" battery has reached its voltage limit and remains energized as long as the voltage of the battery is "up" and the radio set is not in use. Conductors 3' and 4' are those which supply the radio set with current from the "B" battery. 8' designates the cut-off relay, normally bridged across the terminals of the "B" battery, which stops the charging of the "B" battery when its voltage limit has been reached.

When the radio set is turned on the series relay 6 will operate as before described and in moving springs 7 and 14 will open the circuits of relays 8 and 8'. When the set is turned off, relay 6 will deenergize and complete the circuit of relay 8 at spring 7 and its back contact as described in connection with Fig. 2. It will also complete the circuit for relay 8' at spring 14 and its back contact, that circuit being traceable from the positive terminal of the "B" battery, conductor 3', conductor 9', spring 14 and its back contact, winding of relay 8', conductor 4' to the negative terminal of the "B" battery. Relay 8 being marginally adjusted will not energize until the "A" battery voltage reaches maximum, and commercial current is connected to the "A" charger from the source by way of conductor 13, spring 10 and its back contact, spring 11 and its back contact, conductor 12, "A" charger, conductor 15 to source. The "A" charger will then commence to charge the "A" battery.

When the voltage of the "A" battery has been brought to the maximum allowance, relay 8 will operate to disconnect commercial current from the "A" charger by moving spring 11 out of engagement with its back contact.

Likewise, the relay 8' will not energize at once, and commercial current will be connected to the "B" charger in multiple with the "A" charger by way of spring 11' and its back contact, conductor 12', and conductor 16. Therefore the charging process of the "B" battery will take place and it will continue until the voltage of the "B" battery has been brought to its maximum.

When the maximum has been reached, relay 8' will operate to disconnect commercial current from the "B" charger by moving spring 11 out of engagement with its back contact.

If, during the process of charging either the "A" battery or the "B" battery, or both batteries, the radio set should be turned on, relay 6 will operate as before described and stop the charging by moving its springs 7 and 14 out of engagement with their back contacts.

It will be noted that in case of Fig. 3 as in Fig. 2, the cut-off relays are normally bridged across the terminals of their respective batteries so that there is a slight drain upon these batteries at all times. The drain, however, is unconsequential since the resistance of the relays is high.

As stated before, the apparatus diagrammatically represented in Fig. 4 is a modification of that in Fig. 1 and is used in radio systems employing wet "A" and "B" batteries. The equipment used to control the charging of each battery is similar. The series relay 6 has been made common to the two groups of equipment which operate independently of each other, since there would be no advantage in having two series relays when one relay will serve the purpose.

As before described, relay 6 will operate when the radio set is taken into use and will deenergize when the set is taken out of use. When relay 6 operates, it moves its springs 7 and 10 into engagement with their make contacts, thereby completing the obvious circuits for relays 8 and 8' respectively. Relays 8 and 8' will operate and at springs 11 and 11' will complete locking circuits for themselves through relays 14 and 14', respectively. These latter relays will not operate at this time, however, since they are short circuited at springs 7 and 10 of relay 6. Relays 8 and 8' will also move their springs 12 and 12' into engagement with their make contacts to prepare circuits for relays 24 and 24', respectively.

When the radio set is turned off, the circuit for relay 6 will be opened and relay 6 will deenergize, moving springs 7 and 10 out of engagement with their make contacts, thereby removing the short circuits about relays 14 and 14', respectively. When this is done, relay 14 will operate in series with relay 8, the circuit of these relays being traceable from the positive terminal of the "A" battery, conductor 3, conductor 9, winding of relay 8, spring 11 and its make contact, winding of relay 14, spring 23 and its make contact, conductor 13, conductor 4 to the negative terminal of the "A" battery. Relay 14 in operating, completes the circuit for relay 24 at spring 15, and at spring 16 connects commercial current to the "A" charger to operate the charger. The commercial current traverses the following path: source, conductor 20, spring 22 and its back contact, spring 16 and its make contact, conductor 18, "A" charger, conductor 19 to source.

Relay 24 is adjusted so that it will not operate except when the voltage of the "A" battery has reached its predetermined limit. Therefore, relay 24 will not operate at this time and the charging process will start to bring the voltage of the "A" battery up to the prescribed limit. When this limit is reached, relay 24 will operate and, in doing so, will move spring 23 to open the circuit for relays 14 and 8. These relays will deenergize and at springs 15 and 12, respectively, will open the circuit of relay 24 which will then deenergize. Relay 14, will move spring 16 out of engagement with its make contact, thereby disconnecting commercial current from the "A" charger to stop the charging process. Before this is done, however, relay 24 when it operates, moves spring 22 out of engagement with its back contact, inserting the resistance 21 into the circuit of the charger so that the current flow is materially reduced before the spring 16 separates from its make contact. By this arrangement sparking at spring 16 is minimized.

When the short circuit is removed from about relay 14' by relay 6 when the set is turned off, this relay will operate in series with relay 8' in the following circuit: from the positive terminal of the "A" battery, conductor 3, conductor 9, winding of relay 8', spring 11' and its make contact, winding of relay 14', spring 23' and its back contact, conductor 17, conductor 4 to the negative terminal of the "A" battery. Relay 14' in operating moves its spring 15' to complete the circuit for relay 24' across the "B" battery and moves its spring 16' to connect commercial current to the "B" charger to start the charging of the "B" battery. Relay 24' being marginally adjusted will not operate until the charging process has brought the voltage up to the limit. When this limit is reached, the relay 24' operates. The operation of relay 24' starts the same cycle of operations as that started by relay 24, to return the apparatus to normal and to stop the charging process.

Although the regulators shown in the drawing and described hereinbefore have been controlled in each case by a series relay such as relay 6 in Fig. 1 in series with one of the "A" battery leads, it will be obvious that this relay could be replaced by a relay connected beyond the key K across the leads extending to the radio set and that it would then be connected in multiple with the radio set rather than in series therewith and would function in the same manner as in series. This arrangement would be very advantageous if the regulator is conveniently located so that it can be reached when the set is turned on, in which case the key K is in the regulator instead of in the set and only two conductors need to be run from the regulator to the set. By going a step further, the relay 6 may be done away with altogether and the contacts thereof may be added to the key K. In this case the remaining portion of the device will function exactly as before.

Regarding the adjustment of the marginal cut-off relays such as relay 24, Fig. 1, and relay 8, Fig. 2, it may be said, in the case of relay 24, that the pressure exerted by spring 26 upon the armature of relay 24 may be so adjusted that the magneto-motive force created by the flow of current through the winding of relay 24 will not be sufficient to attract the armature to move spring 26 into engagement with its associated contact until the battery voltage has increased to the predetermined limit, while, in the case of relay 8, a spring, separate from spring 11, should be employed to hold the armature of relay 8 out of engagement with spring 11 in its retracted position in order that the armature will be prevented engaging and operating the spring 11 until the required magneto motive force has been created as a result of rise of battery voltage to the required limit, owing to the likelihood of arcing at spring 11 and its resting contact due to the lessening contact pressure as a result of the increase in magneto motive force with the increase in battery voltage as would be the case if the armature normally engaged spring 11. These methods of securing the marginal adjustments of the relays are well known and apply also to relays 24 and 24', Fig. 4, and relay 8', Fig. 3, respectively.

In order to provide for an accurate adjustment of the device after it is placed in operation, any well known adjusting arrangement such as is used in standard practice in connection with telegraph relays may be employed in connection with the marginal high voltage relays, or a variable resistance, having a suitable range in proportion to the resistance of the relay, may be inserted in series with the charge stopping relay and may be adjusted to increase or decrease the resistance of the circuit of the relay so as to secure the desired operation.

As a means of checking up on the operation of the regulating device, it may be pointed out that it has been found to be convenient to merely observe the specific gravity of the electrolyte of the battery from time to time by means of an hydrometer and to regulate the charge stopping relay a slight amount one way or the other if the specific gravity of the electrolyte, as observed, indicates that such regulation is desirable.

For example, it is not necessarily intended that the regulator shall cause the charger to bring the battery up to maximum charge as this would require an exact adjustment of the charge stopping relay and might result in the failure of the charge to stop at all in case of temperature changes and other minor variations. It is suggested that about three-quarters charge is sufficient and that a periodical overcharge may be given to the battery at intervals, which may be accomplished by connecting up the charger to the commercial current directly instead of through the regulator, or it may even be desirable to provide a circuit opening push button or key on the regulator so that the circuit of the charge stopping relay may be opened when desired in order to give the battery an overcharge.

In case the type of charger used makes it necessary to open the connection between the charger and battery while the charger is not in use, normally open contacts may be provided on relay 14, Fig. 1 for this purpose. In Fig. 2 normally closed contacts on the two relays, connected in series, may be provided. Figs. 3 and 4 may be modified accordingly.

What is claimed is:

1. In a battery charging system wherein the discharge current from the battery to be charged flows intermittently, normally inoperative means for starting the charge, means responsive to a flow of discharge current from said battery for preparing the charge starting means for operation, said charge starting means responsive to a cessation of the discharge current for starting the charge, and additional means responsive to an increase of the battery potential for stopping the charge.

2. In a battery charging and regulating system for charging and regulating two separate batteries, means for causing a flow of discharge current from one of the batteries, means automatically responsive to the cessation of the flow of discharge current from said single one of said batteries and independent of discharge current from the other of said batteries for starting the charging operation of both batteries.

3. In a battery charging and regulating system for charging and regulating two separate batteries, means for starting and stopping the flow of discharge current from one of the batteries, means responsive to the stopping of the flow of discharge current from said single one of said batteries and independent of discharge current from the other of said batteries for starting the charging operation of both batteries, and means for automatically stopping the charging of said batteries separately as each is restored to a predetermined condition of charge.

4. In combination, a storage battery, a circuit for discharging said storage battery, a marginal relay connected in shunt of said discharge circuit and adjusted so as to be operated by current from said battery only when the battery has been charged to a predetermined amount, means for causing current to flow intermittently in said discharge circuit, and control means responsive to the flow of current in said discharge circuit for deenergizing said relay coil as long as curent is flowing in said discharge circuit, and a charging circuit for said storage battery, means controlled jointly by said relay and said control means for closing the charging circuit operated at the time the flow of discharge current ceases and means responsive either to the operation of said marginal relay when a predetermined state of charge is reached or to the resumption of the flow of discharge current for opening the charging circuit.

5. In a control system for controlling the charging of a storage battery, a charging circuit and a discharge circuit for the battery, a control relay in said discharge circuit, a relay for closing the charging circuit, said control relay energized when current flows in the discharge circuit to prepare the charge starting relay for operation, and deenergized when current ceases to flow in the discharge circuit to operate said charge starting relay, a test relay controlled by the charge starting relay, and means controlled by the test relay for controlling the charge starting relay for opening the charging circuit.

JOHN I. BELLAMY.